United States Patent [19]

Phillips

[11] Patent Number: 5,507,538
[45] Date of Patent: Apr. 16, 1996

[54] SCREW THREAD FOR THIN-WALLED TUBING

[75] Inventor: Edwin Phillips, North Plainfield, N.J.

[73] Assignee: Scientific Machine and Supply Company, Middlesex, N.J.

[21] Appl. No.: 435,369

[22] Filed: May 5, 1995

[51] Int. Cl.$^6$ .................................................. F16L 15/00
[52] U.S. Cl. .......................... 285/390; 285/334; 285/423
[58] Field of Search ................................... 285/333, 334, 285/350, 390, 423

[56] References Cited

U.S. PATENT DOCUMENTS

| | | | |
|---|---|---|---|
| 4,346,920 | 8/1982 | Dailey | 285/334 |
| 4,799,844 | 1/1989 | Chuang | 285/334 |
| 4,943,094 | 7/1990 | Simmons | 285/333 |
| 5,015,014 | 5/1991 | Sweeney | 285/423 |

Primary Examiner—Eric K. Nicholson
Attorney, Agent, or Firm—Shoemaker and Mattare, Ltd.

[57] ABSTRACT

A screw thread for thin-walled tubing tubing having an outside diameter and a wall thickness less than about one twenty-sixth said diameter, said thread having a depth less than half said wall thickness, a pressure angle below 10°, and a thread pitch at least ten times the thread depth.

6 Claims, 1 Drawing Sheet

U.S. Patent  Apr. 16, 1996  5,507,538
FIG. 1
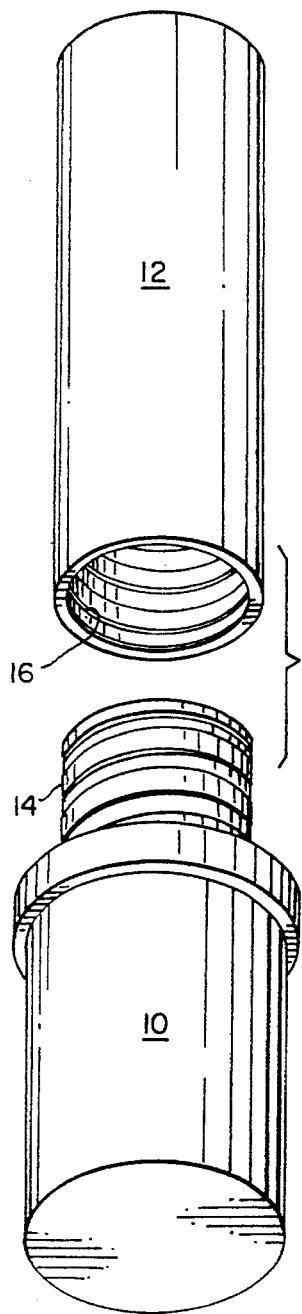
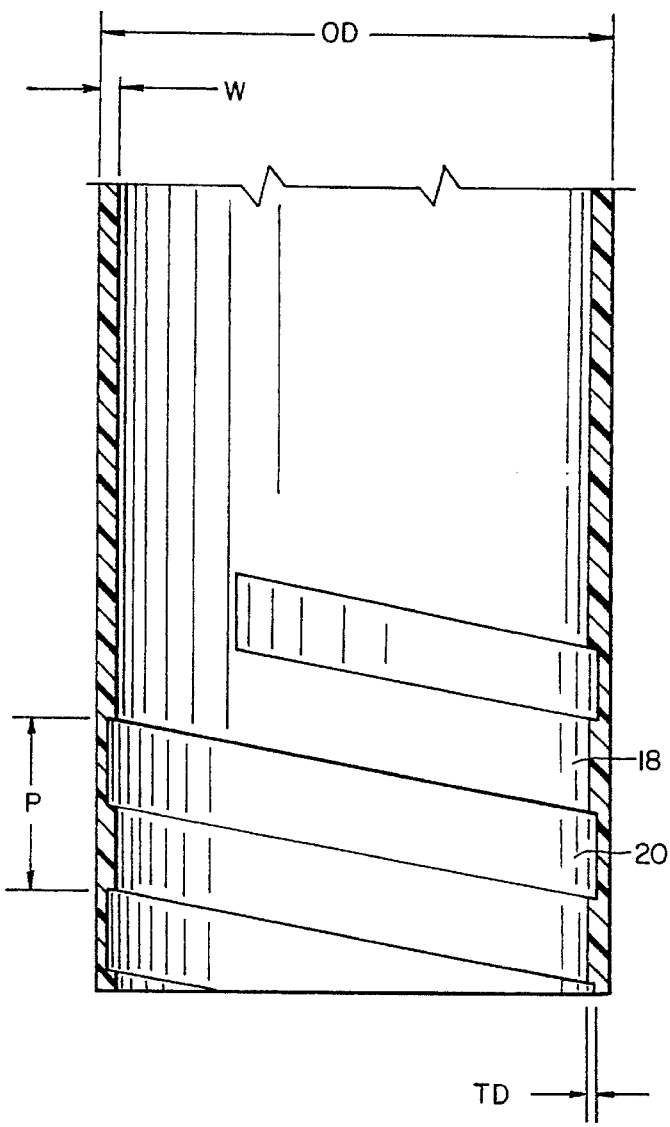
FIG. 2

SCREW THREAD FOR THIN-WALLED TUBING

BACKGROUND OF THE INVENTION

This invention relates to pipe or conduit connections, and more particularly to a screw thread for thin-walled tubing. We define the term "thin-walled" herein to describe tubing having a wall thickness less than about one twenty-sixth its outside diameter.

It is difficult to create adequate threaded connections between a low-modulus thin-walled tube and a mating article, particularly where the tube is internally threaded. Compared to standard tubing, thin-walled tubes stretch more diametrally, so that low-depth threads formed inside such a tube can ramp up and over mating external threads on the article, particularly when the tube is under substantial pressure, or when an axial force is applied to the tube. The difficulties are like those in obtaining a good connection between a water hose and its end fitting. As a consequence, adhesives, external clamps and other types of compression fittings are often used to secure thin-walled tubing.

From a manufacturing and assembly standpoint, it would be desirable to have a threaded connection for thin-walled tubing which could be relied on.

SUMMARY OF THE INVENTION

An object of the invention is to provide a thread which can be formed inside thin-walled tubing to join it to an article.

Another object is to resist thread disengagement when an internally threaded thin-walled tube is under pressure.

A further object of the invention is to provide a thread which can be easily formed inside thin-walled tubes.

These and other objects are attained by a screw thread for thin-walled tubing having an outside diameter and a wall thickness less than one twenty-sixth said diameter, the thread having a depth between a third and a half said wall thickness, a pitch at least ten times the thread depth, and a pressure angle less than ten degrees.

BRIEF DESCRIPTION OF THE DRAWINGS

In the accompanying drawings, FIG. 1 is an exploded isometric view of a thin-walled tube embodying the invention, associated with a pump or baler, and FIG. 2 is a sectional view of the tube, showing the proportions of the threads.

DESCRIPTION OF THE PREFERRED EMBODIMENT

A helical screw thread for thin-walled tubing embodying the invention is shown in FIGS. 1–2, aligned with a baler as an example of a device with which the tube might be used. Balers are used to sample water, for example around factories.

The baler 10 is associated with a thin-walled tube 12, made from glass or a plastic like Teflon (polytetrafluoroethylene). As FIG. 1, shows, the baler has an outlet with an external thread 14, and the tube has a mating internal thread 16. In FIG. 2, the thread crest is designated by numeral 18, and its root or trough by numeral 20.

The tube has a wall thickness "W" not greater than one twenty-sixth the outside diameter "OD" of the tube; that is:

$$OD/26 \geq W$$

Typical dimensions might be 1.63 inch outside diameter, with a 0.060 inch wall thickness. With such tubing, I prefer to keep the thread depth ("TD") below half the wall thickness, but above a third of the wall thickness. That is:

$$W/2 \geq TD \geq W/3$$

In the example given, then, the thread depth would be in the range of 0.020 to 0.030 inch.

Conventional triangular threads of this depth, formed with sufficient diametral clearance between mating threads to allow for manufacturing tolerances, have inadequate strength for thin-walled tubing, in many applications. The triangular threads may simply ramp over one another and disengage under load, particularly when the tubing is under internal pressure, which tends to increase its diameter.

I have found that a strong and reliable threaded union can be created by forming a wide, square thread on the interior of a thin-walled tube, and a corresponding external thread on the mating article. Each such thread has a width "TW" (longitudinally) equal to about half the thread pitch "P", and a depth "TD" (radially) less than a tenth of the thread pitch "P", and, as mentioned above, less than half the wall thickness "W". Therefore, $$P/10 \geq TD.$$

So that the threads are adequately engaged, the total length "L" of the thread should be at least half the outside diameter "OD" of the tube. Thus:

$$L \geq OD/2$$

The corners and fillets of the crests and troughs are made as sharp as possible, but in practice, the corners and fillets may be found to have radii up to 0.010 inch. Also, the pressure angle is as near 0° as possible, so that, ideally, the thread is truly square. Should this ideal present any manufacturing difficulties, a slight positive pressure angle—not above 10°—can be tolerated. "Pressure angle" is intended to mean the acute angle between a perpendicular to the thread flank, and an intersecting line parallel to the axis of the thread.

Finally, it is important that the thread width be much greater than its depth—at least five times as great.

Whether the tube material is glass, or a grindable polymer like Teflon, the thread is easily formed by grinding with a square-edged wheel, using conventional methods. Alternatively, it may be possible to form the threads with a sharp cutter, or to injection mold or otherwise cast the threads. A mating thread is formed on the associated article.

A thin-walled tube expands more under pressure than does a tube with a thicker wall. Such a tube is also more compliant, and better able to stretch if there is an interference with the mating article. The stretchability depends not only on the diameter and wall thickness of the tube, but also on the Young's modulus of the material (ratio of stress to strain), and its ultimate strength. It may be advantageous in some applications, to create radially interfering fits between threads constructed according to this invention, particularly where the tubing material is a low-modulus polymer.

While the invention is illustrated in a helical thread, the invention is not limited to a particular thread helix angle. Consequently, multiple-lead threads may be designed according to the principles of this invention.

Since the invention is subject to modifications and variations, it is intended that the foregoing description and the accompanying drawings shall be interpreted as only illustrative of the invention defined by the following claims.

I claim:

1. A screw thread for thin-walled tubing, for connection to a complementary thread on a mating article, said tubing having an outside diameter and a wall thickness less than about one twenty-sixth said outside diameter, and said tubing thread having a thread depth less than half said wall thickness, a pressure angle below 10°, and a thread pitch at least ten times said thread depth.

2. The invention of claim 1, wherein the thread depth is in the range of one-third to one-half the wall thickness.

3. The invention of claim 1, wherein the pressure angle is about 0°, whereby the thread is substantially square.

4. The invention of claim 1, wherein the thread has crests and troughs whose corners and fillets, respectively, each have a maximum radius of 0.010 inch.

5. The invention of claim 1, wherein the thread has a total engaged length equal to at least half of said outside diameter.

6. The invention of claim 1, wherein said thread has a radially interfering fit with said threads on the mating article.

* * * * *